United States Patent [19]

Sumino et al.

[11] Patent Number: 5,325,470
[45] Date of Patent: Jun. 28, 1994

[54] METHOD OF SYNTHESIZING REAL IMAGE AND COMPUTER GRAPHIC IN IMAGE PROCESSING SYSTEM

[75] Inventors: Shigeo Sumino, Chofu; Hirotada Ueda, Kokubunji; Takafumi Miyatake, Hachioji; Satoshi Yoshizawa, Kawasaki, all of Japan

[73] Assignee: Institute for Personalized Information Environment, Tokyo, Japan

[21] Appl. No.: 837,890

[22] Filed: Feb. 20, 1992

[30] Foreign Application Priority Data

Mar. 11, 1991 [JP] Japan .................. 3-070474

[51] Int. Cl.$^5$ ............................. G06F 15/72
[52] U.S. Cl. .................. 395/121; 395/119; 395/125; 395/133
[58] Field of Search ............... 395/118–121, 395/122, 123; 364/421, 422, 424.02, 449

[56] References Cited

U.S. PATENT DOCUMENTS

| | | | |
|---|---|---|---|
| 4,835,532 | 5/1989 | Fant | 340/728 |
| 4,933,864 | 6/1990 | Evans, Jr. et al. | 364/449 |
| 4,994,989 | 2/1991 | Usami et al. | 395/128 |
| 5,046,852 | 9/1991 | Hametner et al. | 356/398 |

FOREIGN PATENT DOCUMENTS 0220461  5/1987  European Pat. Off. .
61-267182  11/1986  Japan .

OTHER PUBLICATIONS

R. S. Weiss et al., "An error analysis for surface orientation from vanishing points", *Proc. SPIE*, vol. 974, 1988, pp. 187–194 (abstract only from INSPEC database).
C. W. A. M. van Overveld, "Application of a perspective cursor as a 3D locator device", *Computer-Aided Design*, vol. 21, No. 10, Dec. 1989, pp. 619–629.

*Primary Examiner*—Heather R. Herndon
*Assistant Examiner*—Huynh Ba
*Attorney, Agent, or Firm*—Antonelli, Terry, Stout & Kraus

[57] ABSTRACT

A method of synthesizing a real image and a computer graphic (CG) having a complex shape in which the normal vector of each of two adjacent planes of a rectangular parallelepiped CG circumscribed about the CG having a complex shape is determined from the coordinates of six vertices representing the two planes on the basis of a real image of a rectangular parallelepiped, and parameters for three-dimensional rotational transformation of the rectangular parallelepiped CG required for synthesis are determined on the basis of the normal vectors. A CG having a complex shape for synthesis is produced by rotational transformation thereof on the basis of the parameters, and the CG having a complex shape thus produced is synthesized on the real image.

6 Claims, 4 Drawing Sheets

METHOD OF SYNTHESIZING REAL IMAGE AND COMPUTER GRAPHIC IN IMAGE PROCESSING SYSTEM

BACKGROUND OF THE INVENTION

The present invention relates to a method of synthesizing a computer graphics or an image obtained by computer processing (hereinafter referred to as a "CG") and a real image, or more in particular to a method of synthesizing a real image and a CG in an image processing system preferable for efficient synthesis of a real image and a CG.

Conventionally, synthesis of a real image and a CG has been effected by visual environment simulation as described in "Visual Environment Simulation", IPSJ, CG39-1, pp. 1-7, 1989. The visual environment simulation, in which a simulation is made for a case where, for example, an artificial structure is constructed on an actual landscape, has a high utility. For example, an object can be viewed from a point of view that cannot be obtained by other methods such as the use of a miniature model, and the size of an object can be easily changed. Efforts have been made to tackle the visual environment simulation also from the viewpoint of CAD (Computer Aided Design). Such operations (i.e., change in point of view and in shape), however, have been carried out according to a sixth sense based on actual experience or have required information about the point of photographing of the particular landscape, and for this reason, have been unable to be readily performed by general users. On the other hand, as disclosed in "Electronic Studio Settings for Image Production", Proceedings of the Sixth Symposium on Human Interface, pp. 479-486, 1990, and JP-A-61-267182, there is known a method in which such parameters as pan, tilt and zoom in camera operation are recorded at the time of picking up an image and a CG and an image are synthesized by utilizing the parameters in setting a CG. It is not easy for general users, however, to introduce various parameters in camera operation simultaneously with photographing.

SUMMARY OF THE INVENTION

With reference to FIG. 1, explanation will be made about a case in which a real image of a rectangular parallelepiped 3 is actually displayed as an object on a display screen of a workstation and is overlapped with a CG rectangular parallelepiped 2 generated in the workstation. The CG rectangular parallelepiped represents a rectangular parallelepiped circumscribed about a CG 1 (such as an automobile) having a complex shape to be synthesized. The real image, on the other hand, is an image obtained by photographing a rectangular parallelepiped 3 such as a garage as an object. That is, the real image represents a target position or posture of the CG rectangular parallelepiped to be overlapped in the real three-dimensional space. Therefore, if the CG rectangular parallelepiped and the rectangular parallelepiped of the real image can be overlapped together, then the CG having a complex shape and the real image can be synthesized in natural perspective. Reference numeral 4 designates a building, and numeral 5 a road.

The easiest way of overlapping the rectangular parallelepiped of the real image and that of the CG consists in bringing a vertex of the former into registry with that of the latter by translational transformation, followed by rotational transformation so that a side of the rectangular parallelpiped of the real image coincides with a respective axis of the CG rectangular prallelepiped (a side of the CG rectangular parallelepiped), followed by scaling transformation. It is, however, not possible to correctly overlap the rectangular parallelopiped of the CG on that of the real image by performing these operations of translational transformation, rotational transformation and scaling transformation only once. Rather, these three operations are required to be repeated appropriately. Particularly, in the process of rotational transformation where respective rotations around axes affect each other, the position of each axis is changed bit by bit while overlapping the rectangular parallelepiped of the CG on that of the real image gradually.

The positioning operation for translational transformation and scaling transformation is easy as compared with that for rotating transformation. This is because the operation of translational transformation and scaling transformation on the CG rectangular parallelepiped can be performed intuitively as one wishes without affecting a particular axis. The operation of rotating around only one of the x, y and z axes may be effected by slightly changing the rotational angle with respect to the particular axis while overlapping the rectangular parallelepiped of the CG on that of the real image. The rotation around two or more more axes, however is effected in such a manner that an axis providing a rotational axis for the first rotational transformation is selected, and by changing the rotational angle appropriately to determine a provisional position, the object is rotated around another axis. This rotational operation around the second axis affects the position first determined. As a result, the position obtained by the first rotation around an axis is required to be determined again. Further, the positioning sequence is completely different depending on which axis is selected to rotate the object around. As seen from this, with regard to the operation of rotational transformation, only the rotational transformation around the first axis can be performed as intended by the operator, while subsequent rotational transformation must be carried out intuitively on a trial-and-error basis.

The problem to be solved lies in the fact that general users not accustomed to the operation of rotational transformation are unable to efficiently perform the operation of the rotational transformation for synthesizing of a real image and a CG having a complex shape. Therefore, the object of the present invention is to obviate the problem of the prior art and to provide a method of synthesizing a real image and a CG having a complex shape by an image processing system, in which parameters for three-dimensional rotational transformation of a CG having a complex shape required in synthesizing a real image and a CG having a complex shape are calculated by the image processing system on the basis of simple input operations of the operator, thereby improving the operating efficiency of rotational transformation in the process of synthesizing a real image and a CG having a complex shape which has so far consumed considerable labor of the operator.

In order to achieve the above-mentioned object, there is provided a method of synthesizing a real image and a CG having a complex shape in an image processing system of the present invention. In this method, a CG having a complex shape produced by computer processing is synthesized at the desired angle at the desired position by the operator interactively on the real image using a pointing device on a bit map display screen. By use of the normal vector of two planes in the real image which is the target in which two planes of a CG rectangular parallelepiped circumscribed about the CG having a complex shape are to be synthesized, the parameter of each rotational transformation for the two planes of the CG rectangular parallelepiped corresponding to the target two planes is determined. On the basis of each of these parameters of rotational transformation, the CG having a complex shape is synthesized on the real image.

Preferably, the operator determines the vanishing line of each of the two target planes designated by the pointing device which may be a mouse, for example, and by use of these vanishing points, determines the respective normal vectors of the target planes.

Also preferably, the operator determines two vanishing points of each target plane designated by use of the pointing device, and determines the respective vanishing lines passing through the two vanishing points.

Also preferably, each vanishing point is determined from a target plane respectively.

Also preferably, the CG is a rectangular parallelepiped having three sides crossing at a vertex parallel to the three axes of a rectangular coordinate system. The candidate parameter of each rotational transformation causing each normal vector of two planes of the CG of this rectangular parallelepiped to coincide with each normal vector of the target two planes is calculated and displayed on the display screen. By use of the candidate parameter for rotational transformation selected and designated by the operator, a CG having a complex shape to be synthesized in a real image is produced from a CG of a rectangular parallelepiped.

Also preferably, the CG of a rectangular parallelepiped is a hypothetical rectangular parallelepiped surrounding a given three-dimensional CG having a complex shape.

Also preferably, the synthesized state of a CG having a complex shape and a real image is displayed, the synthesis of the CG having a complex shape and the real image is adjusted by use of the parameters including translational, rotational and scaling transformation entered by the operator on the basis of the displayed synthesized state.

In overlapping a CG rectangular parallelepiped on a real image according to the present invention, the operator designates two mutually adjacent plane making up targets in the real image at six points by the pointing device, in such a manner that three vanishing points are formed in each plane. The image processing system calculates the three vanishing points, determines two straight lines passing through a set of two different ones of the three vanishing points, and further determines each normal vector of the two planes of the targets. This normal vector represents the inclination (posture) of the target plane of each of the x, y and z axes in a three-dimensional coordinate system. Then, the image-processing system calculates the amount of rotational transformation (parameter of rotational transformation) of the CG having a complex shape in such a way that each normal vector of the two target planes thus determined may coincide with the normal vector of the plane corresponding to the target plane in the real image making up a plane of the CG rectangular parallelepiped. If the normal vector coincides, the spatial arrangements of the target plane and the corresponding plane coincide with each other and the CG position of the CG having a complex shape position is thereby determined. The amount of rotational transformation is determined by the operator selecting one of eight calculated candidates. The image-processing system actually produces a CG having a complex shape and synthesizes a real image by use of the amount of rotational transformation thus designated. If the synthesized image is still improper the operator sequentially selects and designates an amount of rotational transformation until a proper synthesized image is obtained. In this way, an efficient rotational transformation is made possible, thus enabling the operator to perform the operation of synthesizing a three-dimensional CG having a complex shape on a real image with ease.

DESCRIPTION OF THE PREFERRED EMBODIMENTS

An embodiment of the present invention will be described in detail below with reference to the accompanying drawings.

Figure 2:
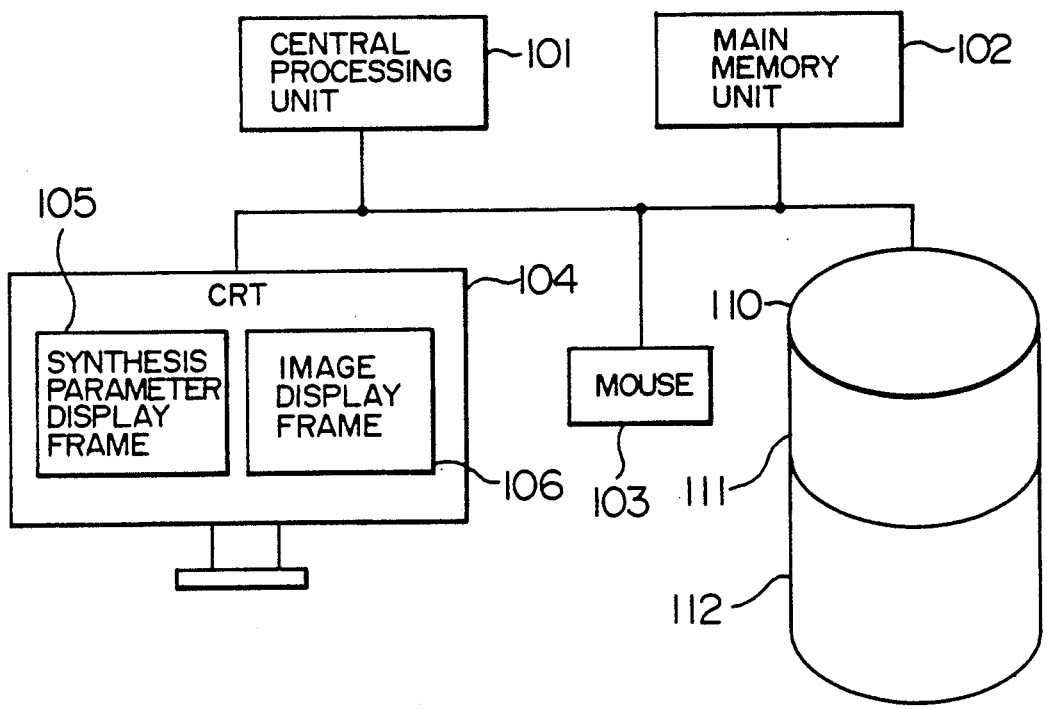
FIG. 2 is a block diagram showing an example of the configuration of an image-processing system embodying a method of image synthesis according to the present invention.

FIG. 2 is a block diagram showing the configuration of an image-processing system according to an embodiment of the present invention.

An image-processing system according to the present invention comprises a bit map display (indicated by CRT in the drawings) 104 for displaying a real image or the like making up the object of synthesis, a mouse 103 as a pointing device for the image displayed on the bit map display 104, a magnetic disk 110 for storing a processing program and data related to the present invention, a main memory unit 102 for storing in a processible state the program and data stored in the magnetic disk 110, and a central processing unit 101 for processing data by use of the program and data stored in the main memory unit 102 according to the present invention. The bit map display 104 includes a synthesis parameter display frame 105 for displaying parameters for translational, rotational and scaling transformation relating to the CG display of the CG having a complex shape display according to the present invention and an image display frame 106 for displaying a real image. The magnetic disk 110 includes a program storage region 111 for storing the program describing various processing sequences including a synthesis processing program according to the present invention and a data file storage region 112 for storing data such as a real image used for the present invention.

According to an image-processing system having the above-mentioned configuration, the operator enters six points representing two adjacent planes of a target by use of the mouse 103 on a real image displayed in the image display frame 106 of the bit map display 104. The central processing unit 101 then calculates a parameter of three-dimensional rotational transformation in the CG rectangular parallelepiped corresponding to the six points forming two planes of the target and displays it in the synthesis parameter display frame 105 of the bit map display 104. When the operator selects a parameter in the synthesis parameter display frame 105, the central processing unit 101 produces a three-dimensional CG having a complex shape on the basis of the parameter thus selected, and then synthesizes the CG having a complex shape in the target two planes entered at representative ones of the six points. Further, when the operator adjusts the parameters for translational or scaling transformation, for example, in the synthesis parameter display frame 105, the central processing unit 101 resynthesizes the real having a complex shape and the CG image in the image display frame 106 on the basis of the parameter thus adjusted.

As described above, the image-processing system according to the present invention makes it possible for the operator to effect the calculation of the parameters for three-dimensional rotational transformation of a CG having a complex shape which has so far been very troublesome for general users by a simple input operation. Furthermore, a CG having a complex shape in an adjusted posture is produced by the particular parameters and is synthesized with a real image and displayed. As a result, the operator can easily synthesize a real image and a CG having a complex shape simply by performing the operation of translational, rotational or scaling transformation. The related processing operation will be described in detail below with reference to a flowchart.

Figure 3:
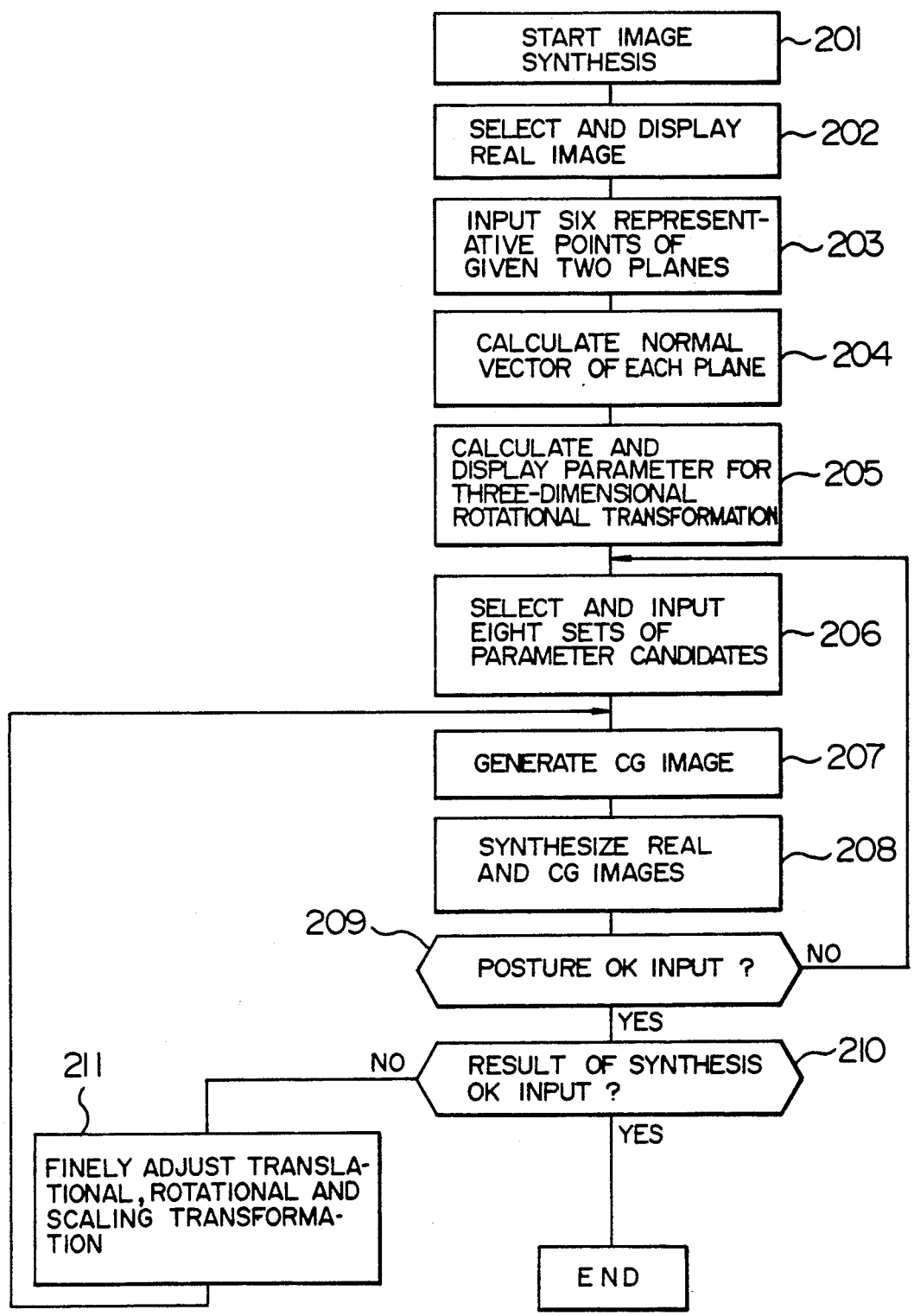
FIG. 3 is a flowchart showing the processing operation according to an embodiment of the present invention.

FIG. 3 is a flowchart showing the processing operation of the image-processing system shown in FIG. 2 according to an embodiment of the present invention.

The process shown in this flowchart permits an efficient synthesizing of a real image and a CG having a complex shape. First, the operator starts a method of synthesizing a real image and a CG (step 201). Upon selection of an image which is to be a real image, the image-processing system displays the image selected by the operator in the image display frame 106 on the display unit 104 in FIG. 2 (step 202).

Figure 1:
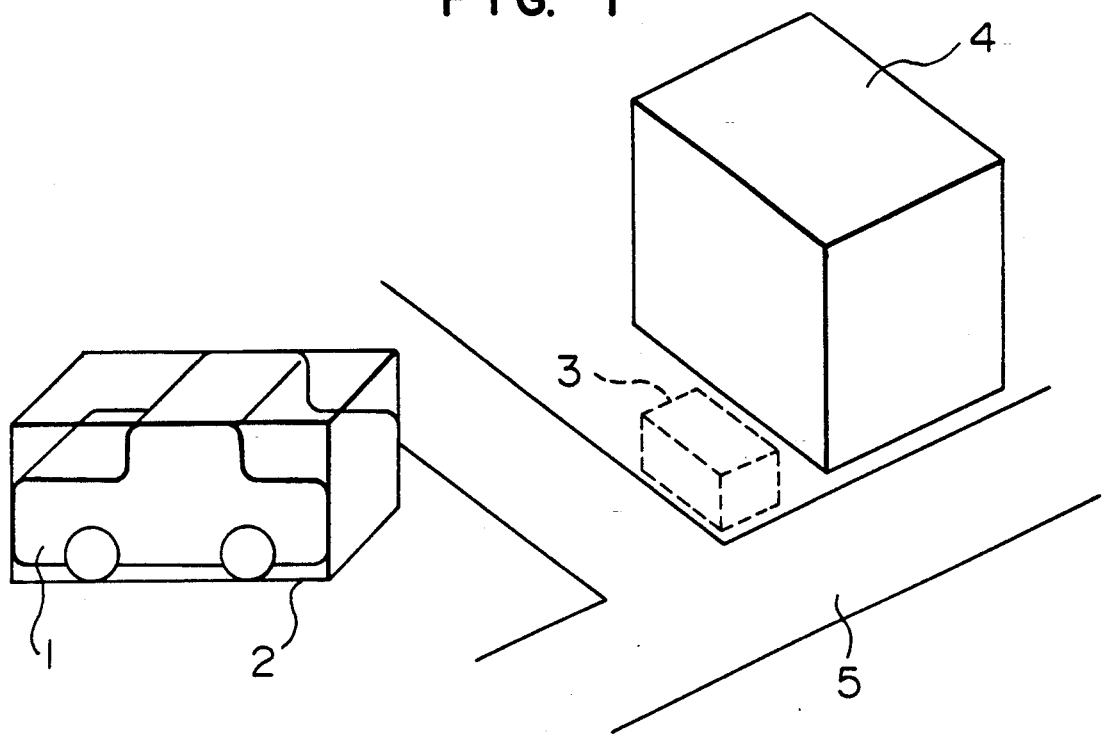
FIG. 1 is a diagram useful for explaining an example of image synthesis of a real image on a CG three-dimensional CG having a complex shape to which the present invention is applicable.

Then, the operator designates six representative points of two adjacent planes making up a target in a real image displayed in the image display frame 106 through an input unit such as the mouse 103 (step 203). As the next step, the operator determines the value of a normal vector of each of the two planes passing through the six designated representative points from the coordinate thereof. A detailed method of calculation of the normal vector value will be explained later. A position of a CG having a complex shape is obtained by setting each normal vector of a CG rectangular parallelepiped circumscribed about the CG having a complex shape to that of the two planes thus determined. Specifically, parameters (rotational angles around x, y and z axes) for effecting a three-dimensional rotational transformation of the CG having a complex shape are calculated from each normal vector of the two planes determined as above and are displayed in the synthesis parameter display frame 105 in FIG. 1. Eight sets of these rotational angles are calculated and displayed. A method of calculating the rotational angles will also be described later.

Upon sequential selection and designation by the operator of one of eight sets of parameters (step 206), the image-processing system subjects the CG having a complex shape to rotational transformation by use of the designated set of parameters thereby to produce a CG having a complex shape for synthesis (step 207). The image-processing system synthesizes the CG having a complex shape thus produced and a real image and displays them on the bit map display 104 in FIG. 2 (step 208). On the basis of this display, the operator can confirm whether the CG having a complex shape and the real image have been synthesized in the same posture according to the designated parameters. The operator enters an affirmative confirmation (step 209), and further makes fine adjustment of the displacement between the CG having a complex shape and the real image in synthesis on the basis of the parameters including translational, rotational and scaling transformation relating to the display of the CG having a complex shape entered for the purpose of fine adjustment (steps 210, 211).

According to the present invention, as described above, the operator can obtain eight sets of parameters required for synthesis simply by entering six points representing adjacent planes of the target by use of the mouse 103 in FIG. 2 in accordance with the real image of the background displayed in the image display frame 106 in FIG. 2. At the same time, the synthesis of a CG having a complex shape and a real image is made possible easily by selecting and designating a set of parameters.

Figure 4A:
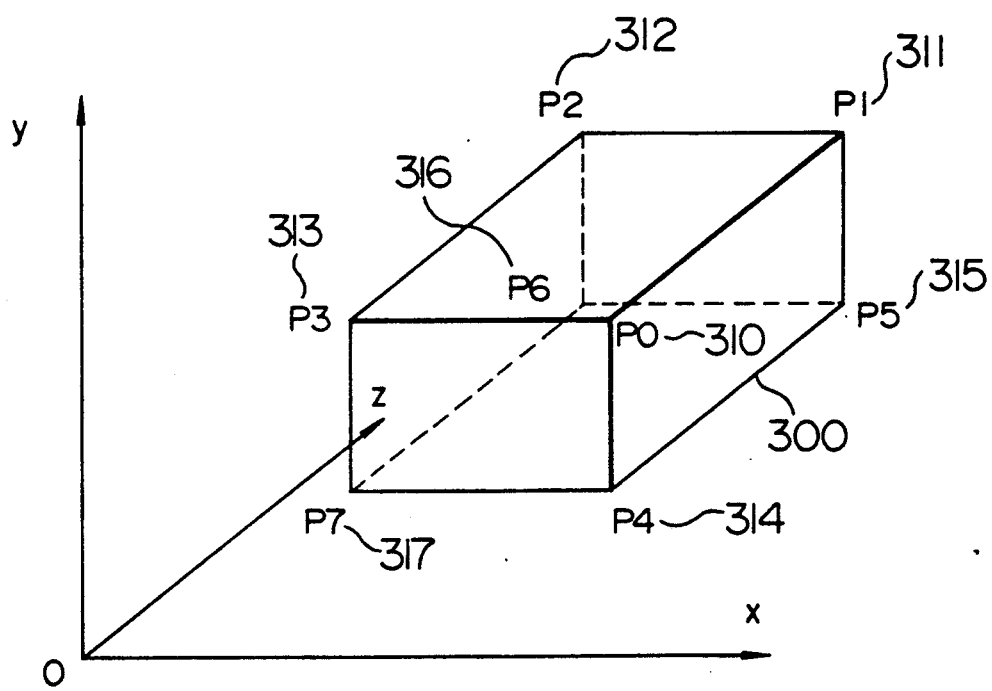
FIGS. 4A and 4B are diagrams useful for explaining the processing operation according to the present invention shown in FIG. 2.
Figure 4B:
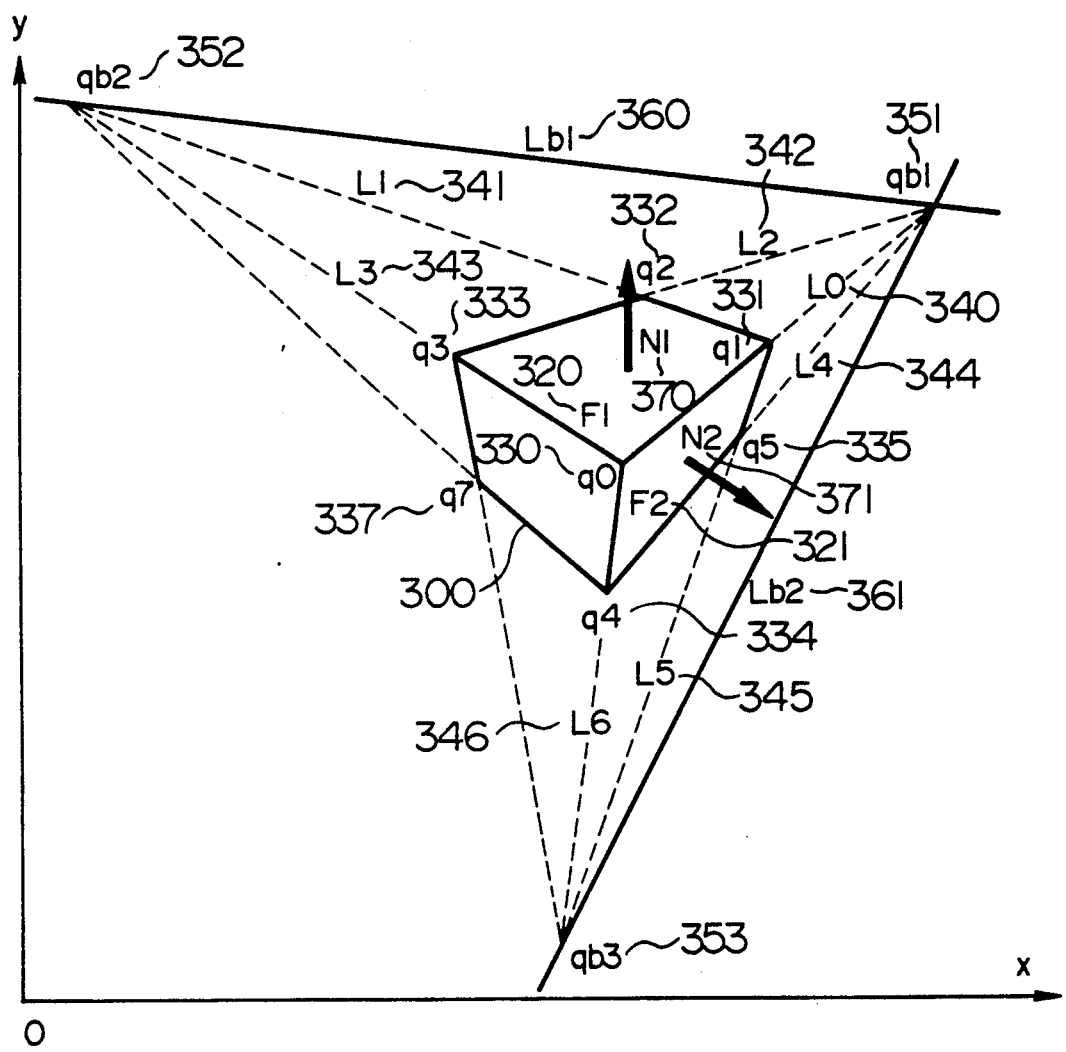

FIGS. 4A and 4B are diagrams for explaining the processing operation for the image-processing system shown in FIG. 2 according to the above-mentioned embodiment of the present invention.

FIG. 4A shows a three-dimensional arrangement of the rectangular parallelepiped to be synthesized. The coordinates of the vertices $P_0310$ to $P_7317$ of the rectangular parallelepiped 300 given on a three-dimensional space are assumed to be $P_0=(X_0, Y_0, Z_0)$, $P_1=(X_1, Y_1, Z_1)$, $P_2=(X_2, Y_2, Z_2)$, $P_3=(X_3, Y_3, Z_3)$, $P_4=(X_4, Y_4, Z_4)$, $P_5=(X_5, Y_5, Z_5)$, $P_6=(X_6, Y_6, Z_6)$. $P_7=(X_7, Y_7, Z_7)$.

FIG. 4B shows the relationship between the coordinates of six representative points of two adjacent planes of the target designated by the operator and the normal vector of each of the two planes. Specifically, assume that the focal length of the camera is given as f, and the vertices $P_0310$ to $P_7317$ of the rectangular parallelepiped 300 as $q_0=(x_0, y_0, f)$, $q_1=(x_1, y_1, f)$, $q_2=(x_2, y_2, f)$, $q_3=(x_3, y_3, f)$, $q_4=(x_4, y_4, f)$, $q_5=(x_5, y_5, f)$, $q_6=(x_6, y_6, f)$ and $q_7(x_7, y_7, f)$, where $q_0330$ to $q_7337$ are the coordinates with the vertices $P_0310$ to $P_7317$ of the rectangular parallelepiped 300 projected perspectively on the two-dimensional projective plane of $z=f$. The coordinates $q_6=(x_6, y_6, f)$ and $q_6336$ are not shown. Also the plane passing through the coordinates $q_0330$ to $q_3333$ is given as $F_1320$, and the plane passing through the coordinates $q_0330$, $q_1331$, $q_5335$ and $q_4334$ as $F_2321$. Further, the straight lines connecting $q_0330$ and $q_1331$, $q_1331$ and $q_2332$, $q_2332$ and $q_3333$, $q_3333$ and $q_0330$, $q_4334$ and $q_5335$, $q_1331$ and $q_5335$, and $q_0330$ and $q_4334$ are given as $L_0340$ to $L_6346$, respectively. Also, the intersection between straight lines $L_0340$ and $L_2342$ is given as $qb_1351$, the intersection between straight lines $L_1341$ and $L_3343$ as $qb_2352$, and the intersection between straight lines $L_5345$ and $L_6346$ as $qb_3353$. The coordinates of these intersections are given as $qb_1=(xb_1, yb_1, f)$, $qb_2=(xb_2, yb_2, f)$ and $qb_3=(xb_3, yb_3, f)$, respectively. In this connection, the intersection $qb_1351$ may be determined also by the straight lines $L_0340$ and $L_4344$ to improve the coordinate accuracy of the intersection $qb_1351$. The straight line, i.e., a vanishing line connecting the intersections $qb_1351$ and $qb_2352$ is given as $Lb_1360$, and the one connecting the intersections $qb_1351$ and $qb_3353$ as $Lb_2361$. Further, the unit normal vector of the plane $F_1320$ is given as $N_1370$, and that of the plane $F_2321$ as $N_2371$.

If the vanishing line $Lb_1360$ is expressed as $a_1x+b_1y+c_1=0$, and the vanishing line $Lb_2361$ as $a_2x+b_2y+c_2=0$, then the unit normal vectors $N_1370$ and $N_2371$ are given by the following equations respectively:

$$N_1 = [n_1, n_2, n_3]^T = \left[\frac{a_1}{r_1}, \frac{b_1}{r_1}, \frac{c_1}{f_1 r_1}\right]^T \tag{1}$$

$$N_2 = [n_4, n_5, n_6]^T = \left[\frac{a_2}{r_2}, \frac{b_2}{r_2}, \frac{c_2}{f_2 r_2}\right]^T \tag{2}$$

where $$f_1 = \sqrt{-xb_1 xb_2 - yb_1 yb_2} \tag{3}$$

$$f_2 = \sqrt{-xb_1 xb_2 - yb_1 yb_2}$$

$$r_1 = \sqrt{a_1^2 + b_1^2 + (c_1/f_1)^2}$$

$$r_2 = \sqrt{a_2^2 + b_2^2 + (c_2/f_2)^2}$$

From these equations, the unit normal vector $N_1370$ of the plane $F_1320$ and the unit normal vector $N_2371$ of the plane $F_2321$ of the rectangular parallelepiped 300 are calculated in the manner mentioned below by the operator designating the coordinates ($q_0330$ to $q_5335$) of the six vertices representing the planes $F_1320$ and $F_2321$.

$$N_1 = \left[\frac{yb_1 - yb_2}{r_1}, \frac{xb_2 - xb_1}{r_1}, \frac{xb_1 yb_2 - xb_2 yb_1}{f_1 r_1}\right]^T \tag{4}$$

$$N_2 = \left[\frac{yb_1 - yb_3}{r_2}, \frac{xb_3 - xb_1}{r_2}, \frac{xb_1 yb_3 - xb_3 yb_1}{f_2 r_2}\right]^T \tag{5}$$

where $$xb_1 = \frac{(x_3 - x_2)(x_0 y_1 - x_1 y_0) + (x_1 - x_0)(x_3 y_2 - x_2 y_3)}{(x_0 - x_3)(y_2 - y_1) - (x_2 - x_1)(y_0 - y_3)} \tag{6}$$

$$yb_1 = \frac{y_1 - y_0}{x_1 - x_0}(xb_1 - x_0) + y_0$$

$$xb_2 = \frac{(x_0 - x_3)(x_1 y_2 - x_2 y_1) + (x_2 - x_1)(x_0 y_3 - x_3 y_0)}{(x_0 - x_3)(y_2 - y_1) - (x_2 - x_1)(y_0 - y_3)}$$

$$yb_2 = \frac{y_3 - y_0}{x_3 - x_0}(xb_2 - x_0) + y_0$$

$$xb_3 = \frac{(x_0 - x_4)(x_1 y_5 - x_5 y_1) + (x_5 - x_1)(x_0 y_4 - x_4 y_0)}{(x_0 - x_4)(y_5 - y_1) - (x_5 - x_1)(y_0 - y_4)}$$

$$yb_3 = \frac{y_4 - y_0}{x_4 - x_0}(xb_3 - x_0) + y_0$$

The ($3\times3$) matrices representing the rotational transformation around the x, y and z axes using parameters $\alpha$, $\beta$ and $\gamma$ are assumed to be $Rx(\alpha)$, $Ry(\beta)$ and $Rz(\gamma)$ respectively, and the matrices representing the sequential rotational transformation around the x, y and z axes to be $R(\alpha, \beta, \gamma) = Rz(\gamma)Ry(\beta)Rx(\alpha) = [rij](i, j = 1, 2, 3)$. In the process, in view of the fact that the rectangular parallelepiped with three sides thereof coinciding with the three axes of a rectangular coordinate system is subjected to rotational transformation, consideration will be made, looking at the rotational transformation of unit vectors E1 and E2 expressed by the following equations assumed to represent the normal vector of a plane of the rectangular parallelepiped H300.

$$E_1 = [1,0,0]^T \tag{7}$$

$$E_2 = [0,1,0]^T \tag{8}$$

The unit vector E1 subjected to three-dimensional rotational transformation $R(\alpha, \beta, \gamma)$, i.e., the rectangular parallelepiped H300 with a plane thereof subjected to rotational transformation is expressed as $R(\alpha, \beta, \gamma)E_1$. When this is considered equal to the unit normal vector $N_1370$ of the plane $F_1320$, the following equation holds:

$$R(\alpha,\beta,\gamma)E_1 = N_1 \tag{9}$$

In similar fashion, the following equation holds for the unit vector E2:

$$R(\alpha,\beta,\gamma)E_2 = N_2 \tag{10}$$

From these equations, the parameters $\alpha$, $\beta$, $\gamma$ for the three-dimensional rotational transformation are determined as follows:

$$\alpha = \sin^{-1}\left(\frac{-n_6}{\cos\beta}\right), \beta = \sin^{-1} n_3, \gamma = \sin^{-1}\left(\frac{-n_2}{\cos\beta}\right) \tag{11}$$

Actually, the function $\sin^{-1}$ is a multi-valued one, and therefore, the following two values are considered as candidates of the value $\beta$:

$$\beta_1 = \sin^{-1} n_3, \beta_2 = \pi - \sin^{-1} n_3 \tag{12}$$

Since there is no appropriate object of comparison for selecting the proper one of the two values, however, two candidates of rotational transformation are displayed and the operator is caused to select the proper one of them. This is also the case with $\alpha$ and $\gamma$, for which there are two candidates of value and accordingly eight sets of candidates of parameters for rotational transformation are displayed.

According to the present embodiment, for facilitating the explanation, reference was made to a case in which a rectangular parallelepiped in a CG image is synthesized on a rectangular parallelepiped in a real image. These rectangular parallelepipeds may alternatively be a hypothetical one surrounding a complex shape, in which case the required parameters can be calculated according to the particular shape from the parameters of the hypothetical rectangular parallelepiped.

As explained above with reference to FIGS. 2, 3, 4A and 4B, according to a method of synthesizing a real image and a CG having a complex shape on each other in an image-processing system of the present embodiment, the calculation of parameters for three-dimensional rotational transformation of a CG having a complex shape which has conventionally caused great trouble for general operators is effected by an image-processing system on the basis of a simple input operation of the operator. Further, the CG having a complex shape is subjected to three-dimensional rotational transformation on the basis of selection and designation of parameters by the operator so that the positions of a real image and a CG having a complex shape coincide with each other. As a result, even general operators unaccustomed to the operation can easily perform the operation of synthesizing a real image and a CG having a complex shape.

According to the present invention, the three-dimensional rotational transformation which is difficult to operate and has so far been performed intuitively by the operator is supported by an image-processing system and can be effected simply by easy entries made with a pointing device, thereby making possible efficient synthesis of a real image and a CG.

We claim:

1. A method of synthesizing a real image and a computer graphic in an image-processing system including a display screen and a pointing device enabling information to be entered on the display screen, the method comprising the steps of:
    (a) generating a three-dimensional computer graphic by interactive computer processing performed using the pointing device to enter information on the display screen;
    (b) generating a rectangular parallelepiped computer graphic circumscribing the three-dimensional computer graphic;
    (c) determining respective normal vectors of two planes in the real image, the two planes in the real image being two planes with which two planes of the rectangular parallelepiped computer graphic are to be made to coincide;
    (d) determining rotational transformation parameters for performing a rotational transformation operation on the rectangular parallelepiped computer graphic to make the two planes of the rectangular parallelepiped computer graphic coincide with the two planes in the real image based on the respective normal vectors of the two planes in the real image;
    (e) performing a rotational transformation operation on the three-dimensional computer graphic based on the rotational transformation parameters to generate a rotated three-dimensional computer graphic; and
    (f) synthesizing the rotated three-dimensional computer graphic and the real image to generate a synthesized image;
    wherein the step (c) includes the substeps of:
    (c1) displaying a real image on the display screen;
    (c2) selecting, with the pointing device, the planes in the real image displayed on the display screen, the two planes in the real image being two planes with which two planes of the rectangular parallelepiped computer graphic are to be made to coincide;
    (c3) determining respective vanishing lines for the two planes in the real image; and
    (c4) determining respective normal vectors of the two planes in the real image based on the respective vanishing lines for the two planes in the real image.

2. A method according to claim 1, wherein the substep (c3) includes the substeps of:

(c31) determining two vanishing points for each plane of the two planes in the real image; and
(c32) determining a line passing through the two vanishing points for said each plane as a vanishing line for said each plane.

3. A method according to claim 2, wherein the two planes in the real image are two mutually adjacent planes in the real image.

4. A method of synthesizing a real image and a computer graphic in an image-processing system including a display screen and a pointing device enabling information to be entered on the display screen, the method comprising the steps of:
    (a) generating a three-dimensional computer graphic by interactive computer processing performed using the pointing device to enter information on the display screen;
    (b) generating a rectangular parallelepiped computer graphic circumscribing the three-dimensional computer graphic;
    (c) determining respective normal vectors of two planes in the real image, the two planes in the real image being two planes with which two planes of the rectangular parallelepiped computer graphic are to be made to coincide;
    (d) determining rotational transformation parameters for performing a rotational transformation operation on the rectangular parallelepiped computer graphic to make the two planes of the rectangular parallelepiped computer graphic coincide with the two planes in the real image based on the respective normal vectors of the two planes in the real image;
    (e) performing a rotational transformation operation on the three-dimensional computer graphic based on the rotational transformation parameters to generate a rotated three-dimensional computer graphic; and
    (f) synthesizing the rotated three-dimensional computer graphic and the real image to generate a synthesized image;
    wherein the rectangular parallelepiped computer graphic has three sides intersecting at a vertex, the three sides respectively being parallel to three axes of a rectangular coordinate system;
    wherein the step (d) includes the substeps of:
    (d1) determining a plurality of sets of candidate rotational transformation parameters for performing a rotational transformation operation on the rectangular parallelepiped computer graphic to make the two planes of the rectangular parallelepiped computer graphic coincide with the two planes in the real image based on the respective normal vectors of the two planes in the real image;
    (d2) displaying the sets of candidate rotational transformation parameters on the display screen; and
    (d3) selecting one of the sets of candidate rotational transformation parameters displayed on the display screen;
    wherein the step (e) includes the substep of performing a rotational transformation operation on the three-dimensional computer graphic based on the selected set of candidate rotational transformation parameters to generate a candidate rotated three-dimensional computer graphic; and
    wherein the step (f) includes the substeps of:

(f1) synthesizing the candidate rotated three-dimensional computer graphic and the real image to generate a candidate synthesized image;

(f2) displaying the candidate synthesized image on the display screen;

(f3) viewing the candidate synthesized image displayed on the display screen to determine whether the candidate rotated three-dimensional computer graphic is properly oriented with respect to the real image;

(f4) if the candidate rotated three-dimensional computer graphic is not properly oriented with respect to the real image, returning to the substep (d3) and selecting a different one of the sets of candidate rotational transformation parameters displayed on the display screen, and repeating the step (e) and the substeps (f1), (f2), (f3), and (f4); and (f5) if the candidate rotated three-dimensional computer graphic is properly oriented with respect to the real image, continuing to display the candidate synthesized image on the display screen as a final synthesized image.

5. A method of synthesizing a real image and a computer graphic in an image-processing system including a display screen and a pointing device enabling information to be entered on the display screen, the method comprising the steps of:

(a) generating a three-dimensional computer graphic by interactive computer processing performed using the pointing device to enter information on the display screen;

(b) generating a rectangular parallelepiped computer graphic circumscribing the three-dimensional computer graphic;

(c) determining respective normal vectors of two planes in the real image, the two planes in the real image being two planes with which two planes of the rectangular parallelepiped computer graphic are to be made to coincide;

(d) determining rotational transformation parameters for performing a rotational transformation operation on the rectangular parallelepiped computer graphic to make the two planes of the rectangular parallelepiped computer graphic coincide with the two planes in the real image based on the respective normal vectors of the two planes in the real image;

(e) performing a rotational transformation operation on the three-dimensional computer graphic based on the rotational transformation parameters to generate a rotated three-dimensional computer graphic; and (f) synthesizing the rotated three-dimensional computer graphic and the real image to generate a synthesized image;

wherein the rectangular parallelepiped computer graphic circumscribing the three-dimensional computer graphic is a hypothetical rectangular parallelepiped computer graphic which is never intended to be displayed on the display screen.

6. A method of synthesizing a real image and a computer graphic in an image-processing system including a display screen and a pointing device enabling information to be entered on the display screen, the method comprising the steps of:

(a) generating a three-dimensional computer graphic by interactive computer processing performed using the pointing device to enter information on the display screen;

(b) generating a rectangular parallelepiped computer graphic circumscribing the three-dimensional computer graphic;

(c) determining respective normal vectors of two planes in the real image, the two planes in the real image being two planes with which two planes of the rectangular parallelepiped computer graphic are to be made to coincide;

(d) determining rotational transformation parameters for performing a rotational transformation operation on the rectangular parallelepiped computer graphic to make the two planes of the rectangular parallelepiped computer graphic coincide with the two planes in the real image based on the respective normal vectors of the two planes in the real image;

(e) performing a rotational transformation operation on the three-dimensional computer graphic based on the rotational transformation parameters to generate a rotated three-dimensional computer graphic; and (f) synthesizing the rotated three-dimensional computer graphic and the real image to generate a synthesized image;

(g) displaying the synthesized image on the display screen;

(h) viewing the synthesized image displayed on the display screen to determine whether the rotated three-dimensional computer graphic is properly oriented with respect to the real image;

(i) if the rotated three-dimensional computer graphic is not properly oriented with respect to the real image, inputting transformation parameters for performing at least one of a translational transformation operation, a rotational transformation operation, and a scaling transformation operation on the rotated three-dimensional computer graphic, adjusting an orientation of the rotated three-dimensional computer graphic with respect to the real image by performing at least one of a translational transformation operation, a rotational transformation operation, and a scaling transformation operation on the rotated three-dimensional computer graphic based on the inputted transformation parameters, and repeating the steps (f), (g), (h), and (i); and (j) if the rotated three-dimensional computer graphic is properly oriented with respect to the real image, continuing to display the synthesized image on the display screen as a final synthesized image.

* * * * *